(12) United States Patent
Guo et al.

(10) Patent No.: US 9,537,736 B2
(45) Date of Patent: Jan. 3, 2017

(54) METHODS AND SYSTEMS TO GENERATE REPORTS INCLUDING REPORT REFERENCES FOR NAVIGATION

(75) Inventors: Ya-Feng Guo, Shanghai (CN); Balaji Krishnamurthy, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 562 days.

(21) Appl. No.: 13/977,909

(22) PCT Filed: Jan. 31, 2011

(86) PCT No.: PCT/CN2011/000170
§ 371 (c)(1),
(2), (4) Date: Jul. 1, 2013

(87) PCT Pub. No.: WO2012/103665
PCT Pub. Date: Aug. 9, 2012

(65) Prior Publication Data
US 2013/0297805 A1  Nov. 7, 2013

(51) Int. Cl.
| | | |
|---|---|---|
| G06F 15/16 | (2006.01) | |
| H04L 12/26 | (2006.01) | |
| H04L 29/08 | (2006.01) | |
| G06Q 10/10 | (2012.01) | |
| G06F 12/00 | (2006.01) | |

(52) U.S. Cl.
CPC ............... H04L 43/06 (2013.01); G06Q 10/10 (2013.01); H04L 29/08144 (2013.01)

(58) Field of Classification Search
CPC  G06F 17/211; G06F 17/248; G06F 17/30327; G06F 17/30604; G06F 17/30607; G06F 17/30961; G06F 17/30994; G06F 8/20; H04L 12/2602; H04L 41/0893; H04L 41/12; H04L 41/22; H04L 43/00; H04L 43/028
USPC .................................. 709/203, 223–229, 250
See application file for complete search history.

(56) References Cited

U.S. PATENT DOCUMENTS

| | | | |
|---|---|---|---|
| 6,569,205 B1 * | 5/2003 | Poggi ............................ | 715/202 |
| 7,181,436 B1 | 2/2007 | Conley et al. | |
| 7,340,499 B1 * | 3/2008 | Casella ............ | G06F 17/30876 707/E17.112 |

(Continued)

FOREIGN PATENT DOCUMENTS

| | | |
|---|---|---|
| CN | 101281558 | 10/2008 |
| WO | WO-2006061270 | 6/2006 |

OTHER PUBLICATIONS

Chowdhary, Pawan, et al. "Model-driven dashboards for business performance reporting." Enterprise Distributed Object Computing Conference, 2006. EDOC'06. 10th IEEE International (pp. 374-386). IEEE, 2006.

(Continued)

*Primary Examiner* — Zarni Maung
(74) *Attorney, Agent, or Firm* — Hewlett Packard Enterprise Patent Department

(57) ABSTRACT

In one embodiment, a report generation system receives a request for a first report associated with a first resource and identifies a second resource associated with the first resource. The report generation system then generates a reference to a second report for the second resource. The report generation system then provides the first report for the user. The first report includes the reference to the second report.

20 Claims, 12 Drawing Sheets

(56) References Cited

U.S. PATENT DOCUMENTS

| | | |
|---|---|---|
| 7,519,700 B1 | 4/2009 | Sapsford et al. |
| 7,650,349 B2 | 1/2010 | Yeh et al. |
| 2002/0077930 A1* | 6/2002 | Trubey et al. ................. 705/26 |
| 2003/0009507 A1* | 1/2003 | Shum ................. G06F 11/3409 |
| | | 718/104 |
| 2005/0144072 A1* | 6/2005 | Perkowski et al. ............. 705/14 |
| 2006/0005112 A1 | 1/2006 | Lilly et al. |
| 2007/0005583 A1 | 1/2007 | Chau et al. |
| 2008/0162420 A1* | 7/2008 | Ahrens et al. ................... 707/2 |
| 2009/0138500 A1 | 5/2009 | Yuan et al. |

OTHER PUBLICATIONS

Cisco Performance Visibility Manager 1.0.
English translation (machine-generated) of Abstract from Chinese Patent Publication No. 101281558.
International Search Report, Nov. 10, 2011. PCT Patent Application No. PCT/CN2011/000170, filed Jan. 31, 2011.

* cited by examiner

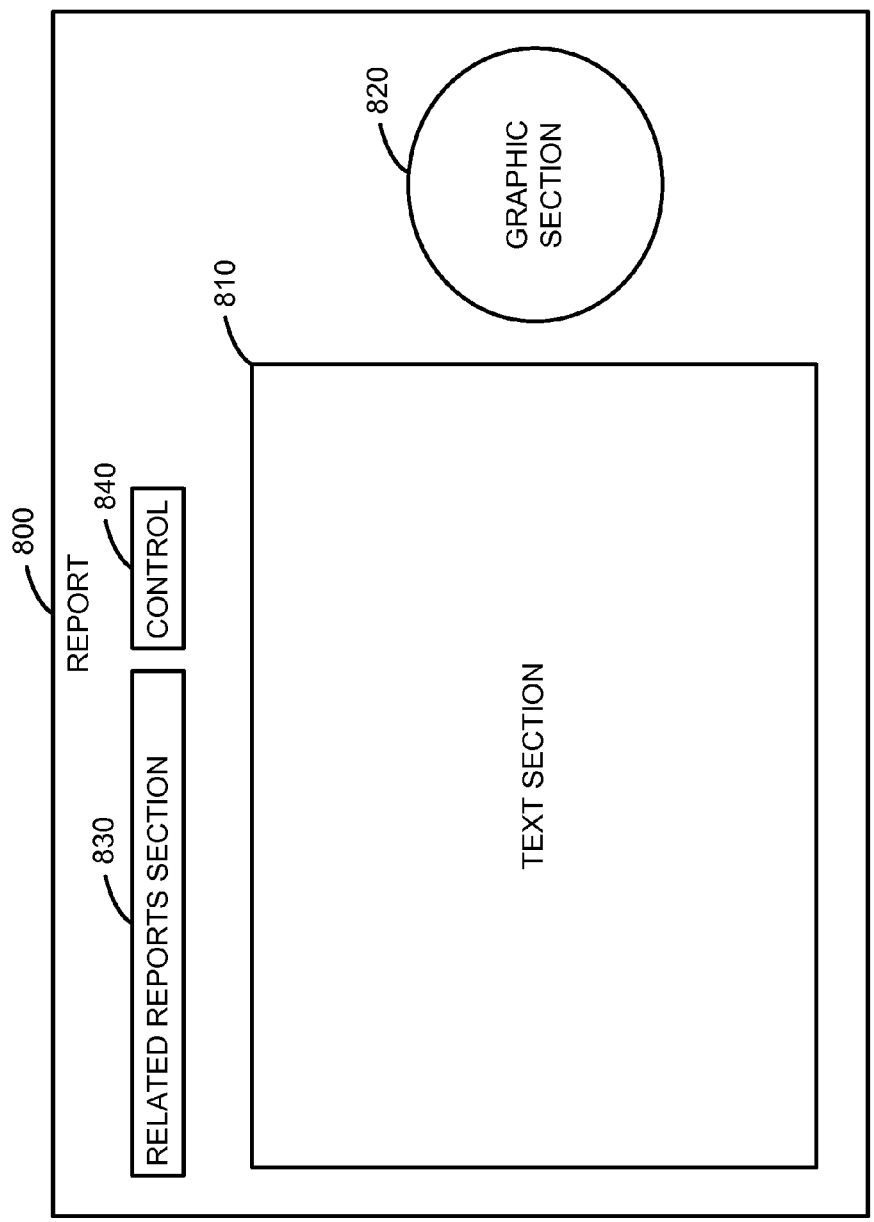

METHODS AND SYSTEMS TO GENERATE REPORTS INCLUDING REPORT REFERENCES FOR NAVIGATION

CROSS-REFERENCE TO RELATED APPLICATION

This application is a U.S. National Stage Application of and claims priority to International Patent Application No. PCT/CN2011/000170, filed on Jan. 31, 2011, and entitled "METHODS AND SYSTEMS TO GENERATE REPORTS INCLUDING REPORT REFERENCES FOR NAVIGATION".

BACKGROUND

Report generation tools access data values representing utilization, status, properties, characteristics, statistics, and/or other parameters of logical and physical resources within a communications network and generate a report based on those values. Typically, a user of a report generation tool selects one or more reports from a group of reports available at the report generation tool via a report selection interface (i.e., a graphical user interface ("GUI") or command line interface ("CLI")) and those reports are generated and displayed to the user.

Users often request reports from a report generation tool to troubleshoot or diagnose operational anomalies (or problems) in an information system such as a communications network. Frequently, after discovering an unexpected value or some other indication of an operational problem within a report, a user generates additional reports to determine the status or operational state of other resources that are in related to the resource associated with the original report.

BRIEF DESCRIPTION OF THE DRAWINGS

FIGS. 8A and 8B are illustrations of a report, according to an embodiment.

DETAILED DESCRIPTION

Figure 1:
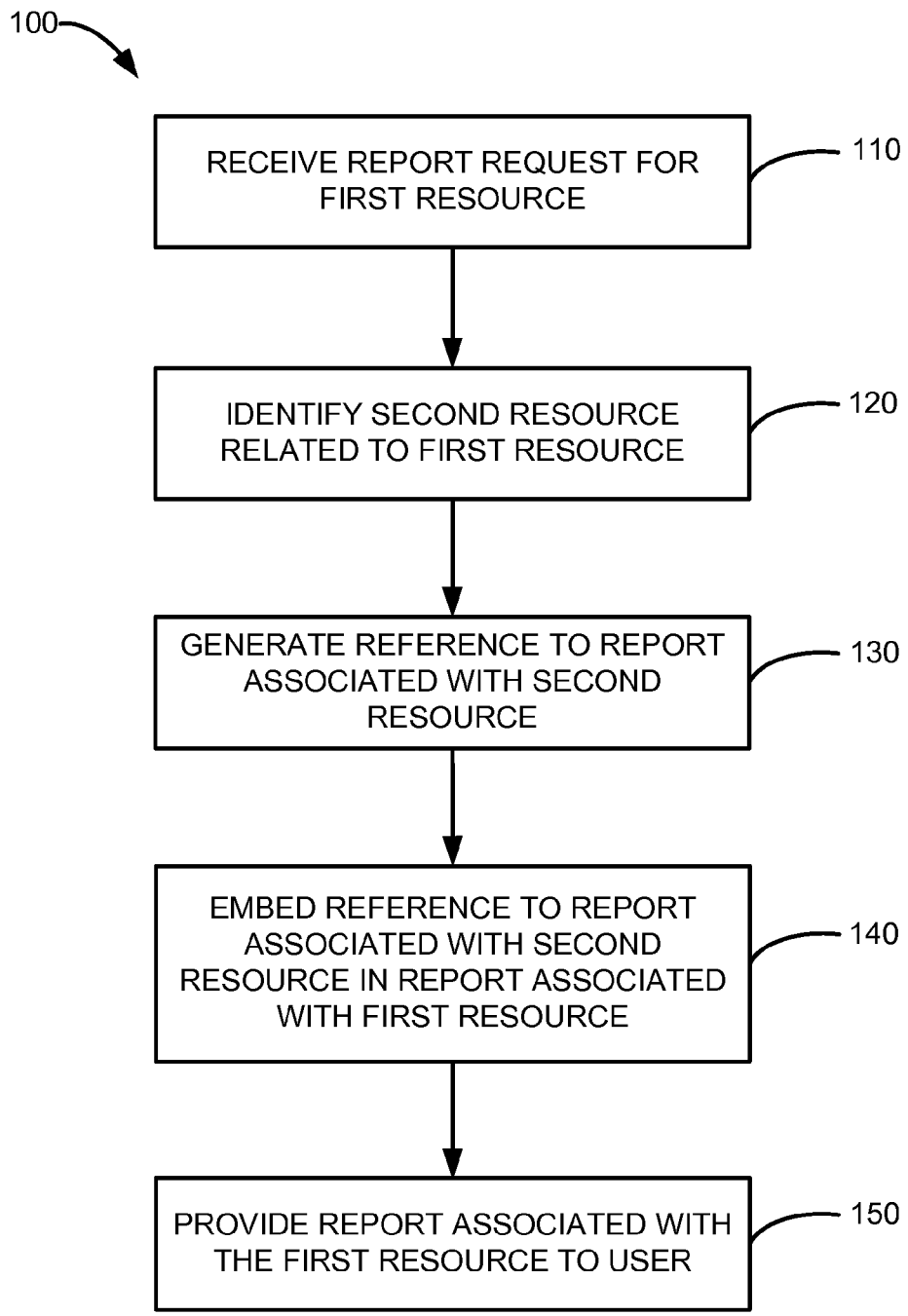
FIG. 1 is a flowchart of a process to generate a report including a reference to a related report, according to an embodiment.

Reports are used to display, organize, and/or analyze data from information systems. Reports can include textual information, numerical information, and/or graphical information that describe and/or illustrate utilization, status, properties, characteristics, statistics, and/or other parameters of logical resources (e.g., network services, software applications, virtual private networks ("VPNs"), client applications, service-level agreements, virtual machines or other virtualized resources, and/or other logical services or devices) and/or physical resources (e.g., computing devices such as servers or client devices; network devices such as communications links, switches, routers, bridges, and/or gateways; and/or storage devices such as storage arrays or storage servers) within an information system such as a communications network. Such reports can be useful to administrators of information systems because these reports often consolidate information related to the performance and/or health of these information systems.

Report generation tools (also referred to as management and/or analysis software modules) typically access data (i.e., data values) representing utilization, status, properties, characteristics, statistics, and/or other parameters of logical and physical resources accessible within a communications network and generate a report including information requested by a user such as a systems administrator. In other words, a user can request (or select) a report related to one or more logical and/or physical resources and the report generation tool generates the requested report. In some embodiments, software modules hosted within the communications network can communicate with the logical and physical resources and populate tables in one or more databases such as a configuration management database ("CMDB") with values related to utilization, status, properties, characteristics, statistics, and/or other parameters of those logical and physical resources, and a report generation tool can access the values related to utilization, status, properties, characteristics, statistics, and/or other parameters at the one or more databases. In some embodiments, a report generation tool can access the data related to utilization, status, properties, characteristics, statistics, and/or other parameters of logical and physical resources directly at those logical and physical resources.

Typically, a user of a report generation tool selects one or more reports from a group of reports available at the report generation tool via a report selection interface (i.e., a user interface such as a graphical user interface ("GUI") including, for example, a tree view of available reports or a command line interface ("CLI")) and those reports are generated and provided for (e.g., sent to, stored for, or displayed for) the user. For example, a report generation tool can define a network- or web-based interface via which the user can select reports using an Internet browser hosted at a client device (e.g., a computing device such as a personal computer) operated by the user. The report is generated by the report generation tool in response to selection of a report by the user and is provided for the user within the Internet browser, for example, using the Hypertext Transport Protocol ("HTTP") and the Hypertext Markup Language ("HTML"). In other embodiments, a user can request reports from the report generation tool via a software application hosted at a client device that is in communication (e.g., via a communications link) with the report generation tool, and reports can be provided from the report generation tool for the user via the software application.

Users of report generation tools often discover anomalies or values that indicate a logical or physical resource (also referred to generically as a resource) is experiencing an operational problem when reviewing reports. Furthermore, users often request reports from a report generation tool to troubleshoot or diagnose operational anomalies in an information system. Frequently, after discovering an unexpected value or some other indication of an operational problem within a report, a user generates additional reports to determine the status or operational state of another resource that is related to the resource associated with the original report. For example, the original report can be related to a software application hosted at a server and the other (or related) report can be related to that server. Thus, the user returns to the report selection interface of the report generation tool to select a report for the other resource.

Navigating among various reports and report selection interface to diagnose an operational problem can be tedious for users. For example, a report related to a software application hosted at a server can identify the server with a long Uniform Resource Identifier ("URI") that the user must remember or record in order to select a report for that server via the report selection interface. Moreover, the user typically must manage multiple open views or windows of reports to maintain a record of the reports accessed and the values included therein to document the user's diagnosis (or diagnostic process) of the operational problem.

Embodiments disclosed herein generate reports that include references to one or more related reports (also referred to as report references). Related reports are related one to another (or associated one with another) based on relationships between resources, utilization, status, properties, characteristics, statistics, and/or other parameters represented within those reports. For example, a report related to a software application such as an electronic mail server (i.e., a logical resource) can include references to reports related to a virtual machine (i.e., another logical resource) at which the software application is hosted and to a server (i.e., a physical resource) at which the virtual machine is hosted. Thus, the user can navigate to one of the related reports (i.e., the reports related to the virtual machine and the server) by selecting (e.g., clicking with a mouse) the references to the related reports.

Moreover, context information (also referred to as context) associated with the report related to the software application for which the report related to the software application was generated, and/or other information associated with the report related to the software application and/or with the software application) can be passed (or provided) to the related reports. A context can include an identifier of the software application (or other resource), a time (e.g., a time period or range) related to the report, a reference to another report, and/or other contextual information related to a report. The context can be described in or defined by a context identifier that includes codes such as markup codes, descriptors, or other specifications to identify and/or communicate the context.

As an example of a context, the related reports can include a reference to the original report (i.e., the related to the software application) with the context of the original report. The user can select the reference to the original report to navigate from the related reports to the original report. Thus, the user can navigate among related reports without navigating to a report selection interface and without losing the context of the original report. The context identifier can include, for example, codes that specify an identifier of a host server, an identifier of an Oracle™ Database Instance (e.g., a name of the Oracle™ Database Instance), and a time range (e.g., the time range for which a report was generated).

As another example, a user generates an executive report that include summary information related to many Oracle™ Database Instances during a range (or period) of time. One or more values representing that time range are added to a context identifier. The user selects one of the Oracle™ Database Instances to access a report including additional information for that Oracle™ Database Instance. An identifier of that Oracle™ Database Instance is added to the context identifier in response to the user's selection.

The report including additional information for that Oracle™ Database Instance is generated based on or for the range of time identified by the context and is provided for the user. Moreover, the report including additional information for that Oracle™ Database Instance includes a reference to a report for the server hosting that Oracle™ Database Instance (i.e., the host server of the Oracle™ Database Instance). The user selects the reference to the report for the host server to access that report, an identifier of that host server is added to the context identifier, and a report for that host server is provided for the user. Thus, the context and, therefore, context identifier can change as the user navigates reports.

Moreover, the report generation tool can embed within each report a list of references including the context of reports that were previously generated. Thus, from any report, the user can select a reference to and, thus, navigate to reports that were previously generated in the order in which these reports were generated. For example, a user can request a first report to diagnose an operational problem within a communications network by selecting the first report from a report selection interface. After the first report is generated by the report generation tool, the user views the first report and requests a second report related to the first report by selecting a reference to the second report included at (or embedded within) the first report. The second report is generated by the report generation tool (and includes a reference to the first report) an provided for the user, and the user requests a third report related to the second report based on, for example, a value included within the second report by selecting a reference to the third report included at the second report. After the third report is generated by the report generation tool, the user analyzes the third report and determines the cause of the operational problem. The third report includes a reference to the second report and a reference to the first report. The user can then retrace his or her steps by selecting the reference to the second report or the reference to the first report. Moreover, if the user selects the reference to the first report, the reference to the second report and a reference to the third report are included at the first report after it is provided for the user by the report generation tool.

Thus, the user can easily navigate among the previously requested reports by selecting the references to those reports at the report the user is presently viewing. Furthermore, because the context of each report can also be included within or with the report references at each report as a context identifier, the reports provided for the user in response to selection of the report references have (or are within) the same context (i.e., generated for the same range of time) as when those reports were originally generated and provided for the user. Alternatively, the context and/or references to other reports can be stored as, for example, cookies by a web browser that is used to access the reports.

As used herein, the singular forms "a," "an," and "the" include plural referents unless the context clearly dictates otherwise. Thus, for example, the term "virtual machine instance" is intended to mean one or more virtual machine instances or a combination of virtual machine instances. Additionally, as used herein, the term "module" refers to circuitry and/or software, firmware, programming, machine- or processor-readable instructions, commands, or code that are stored at a memory and executed or interpreted (or hosted) at a processor.

FIG. 1 is a flowchart of a process to generate a report including a reference to a related report, according to an embodiment. Process 100 can be implemented as a hardware module, as a software module hosted at a computing device, and/or as a combination of a hardware module and a software module. For example, process 100 can be implemented as application-specific circuitry or as a software module including instructions stored at a memory and executed at a processor in communication with the memory. More specifically, for example, process 100 can be implemented at a computing device within a communications network.

A report request for a first resource is received at block 110. For example, a report request can be received in response to selection of a report for the first resource at a graphical user interface defined by a report generation tool. In other words, a user of a report generation tool can select an icon representing the first resource or the report and a request for the report is received at the report generation tool in response to the user's selection.

A second resource related to the first resource is then identified at block 120 in response to the report request. The second resource can be related to the first resource in a number of ways. For example, the first resource can be a software application or virtual machine that is hosted at a second resource such as a server. Alternatively, for example, the first resource can be a software application and the second resource can be a data store at which the software application accesses data (e.g., reads data from and/or writes data to). The report generation tool can identify the second resource by, for example, querying a CMDB that includes or aggregates information about resources within a communications network. That is, the CMDB can include information about relationships among the logical resources and physical resources within the communications network. Thus, for example, the report generation tool can query the CMDB using an identifier of the first resource to identify a group of resources, including the second resource, to which the first resource is related.

As another example, the second resource can be related to the first resource based on a common resource type of the first resource and the second resource. For example, the first resource can be a host resource (i.e., a resource that hosts one or more other resources or software applications) and the second resource can also be a host resource. Thus, the first resource and second resource can be related by the resource type of the first resource and the second resource.

After the second resource is identified at block 120, a reference to a report associated with the second resource is generated at block 130. The reference to the report can be, for example, a URI, a group of instructions or commands, a query, or some other designation of a particular report. For example, the reference can be a URI that can be interpreted by the report generation tool to generate a report associated with the second resource. More specifically, for example, the reference to the report (or report reference or reference) can be a URI of a report template that includes arguments or parameters that identify a resource and/or a context for which a report is generated based on the report template. That is, the report reference can be a URI of a report template that includes name/value pairs identifying the resource and a context of that resource specified in a context identifier. A report that conforms to the report template can then be generated based on values associated with the resource identified in the report reference.

In some embodiments, the report reference can also include an identifier of a report type and a report of that report type is generated based on other arguments or parameters of the report reference. Alternatively, for example, the report reference can be a URI of a previously generated report. In other words, the report reference can identify a report that was previously generated and is stored, for example, at a web server, at a data store (such as a hard drive) of a computing device, and/or at some other data storage device or service. In some embodiments, more than one report can be related to the second resource (e.g., different reports can each include information related to one of utilization, status, properties, characteristics, statistics, and/or other parameters of the second resource) and the reference can identify a particular report for the second resource.

The report reference can be generated based on a variety of parameters or properties of the report requested at block 110. For example, the report reference can be generated based on a resource type (i.e., the kind or class of one or more resources) of the first resource. As a specific example, the first resource can be a host resource. At block 120, a CMDB, topology tree, and/or service tree can be accessed to identify other host resources and the second resource can, thus, be identified. A URI identifying a report for the second resource can then be generated at block 130. In other words, context information such as a host name of the second resource can be included within the URI. Similarly, the first resource can be a host resource and the second resource can be an Oracle™ instance hosted at the host resource identified at block 120, and a URI identifying a report for the second resource can then be generated at block 130. That is, a CMDB, topology tree, and/or service tree can be accessed to identify resources hosted at the first resource and the Oracle™ instance (i.e., an Oracle™ instance resource) can be so identified. Context information such as the Oracle™ instance name of the second resource can then be included within the URI.

Moreover, references to reports associated with multiple resources identified at block 120 can be generated at block 130. For example, the first resource can be a host resource. At block 120, two other host resources within a communications network, an Oracle™ instance resource hosted at the first resource, and a web server resource that accesses the Oracle™ instance resource can be identified at block 120. That is, additional resources can be identified at block 120 based on the resource type of the first resource and dependencies among the first resource and other resources related to the first resource (here, the Oracle™ instance resource and the web server resource). Said differently, resources related to the first resource can be identified in a recursive fashion. Thus, for example, a report for the first resource can include reference to reports for resources that are not directly related to the first resource.

References to reports for each of the resource identified at block 120 can then be generated at block 130. More specifically, for example, URIs referencing reports for the two other host resources each including a host name and other information within a context identifier for the URIs, a URI referencing a report for the Oracle™ instance resource including the Oracle™ instance name of the Oracle™ instance resource and other information as context for the URI, and a URI referencing a report for the web server resource including a name of the web server resource and other information as context for the URI can be generated at block 130 as references to resources related to the first resource.

The reference to the report associated with the second resource is then embedded within the request report associated with the first resource at block 140. That is, the reference to the report associated with the second resource is included in the report associated with the first resource at block 140. For example, the report associated with the first resource can be defined using HTML as a web page and instructions based on scripting language such as JavaScript™ or HTML codes including the reference to the report associated with the second resource can be inserted within the report to embed the reference to the report associated with the second resource in the report associated with the first resource. As a more specific example, the reference to the report associated with the second resource can be URI (e.g., a hyperlink) that is included within a list box defined by JavaScript™ instructions embedded within the report associated with the first resource at block 140. Thus, a user of the report generation tool can select the reference from the report associated with the first resource at the list box to request the report associated with the second resource.

The report associated with the first resource and including the reference to the report associated with the second resource is then provided for the user at block 150. For example, the report can be sent to the user (or a client device or client software application via which the user is accessing the report generation tool) or can be stored at a location at which the user can access the report. More specifically, for example, the report can be sent directly to an Internet browser at which the user can view the report. Alternatively, for example, the report can be stored at a data store and a URI of the report can be provided for the user. As a specific example, a URI of the report and a redirect instruction can be sent to an Internet browser such that the Internet browser accesses the report via the URI. In yet another alternative, the report is provided for the user (e.g., is stored) at a location (e.g., a file at a data store identified by a URI) that is known to the user (or a client device or client software application via which the user is accessing the report generation tool) and the user accesses the report at that location. As discussed above, after the report is provided for the user at block 150, the user can request the report associated with the second resource by selecting the reference to the report associated with the second resource at the report.

Process 100 can include addition or fewer blocks than those illustrated in FIG. 1. For example, process 100 can include a block at which the report associated with the first resource is accessed. In some embodiments, the report associated with the first resource is generated (e.g., by accessing data stored at a CMDB accessible to the report generation tool and/or manipulating those data) in response to the report request. Alternatively, for example, the report associated with the first resource is generated before the report request is received at block 110 and is accessed in response to the report request. Additionally, one or more blocks can be rearranged. Furthermore, although process 100 is discussed above with reference to an example environment within a communications network, process 100 is applicable within other environments.

Figure 2:
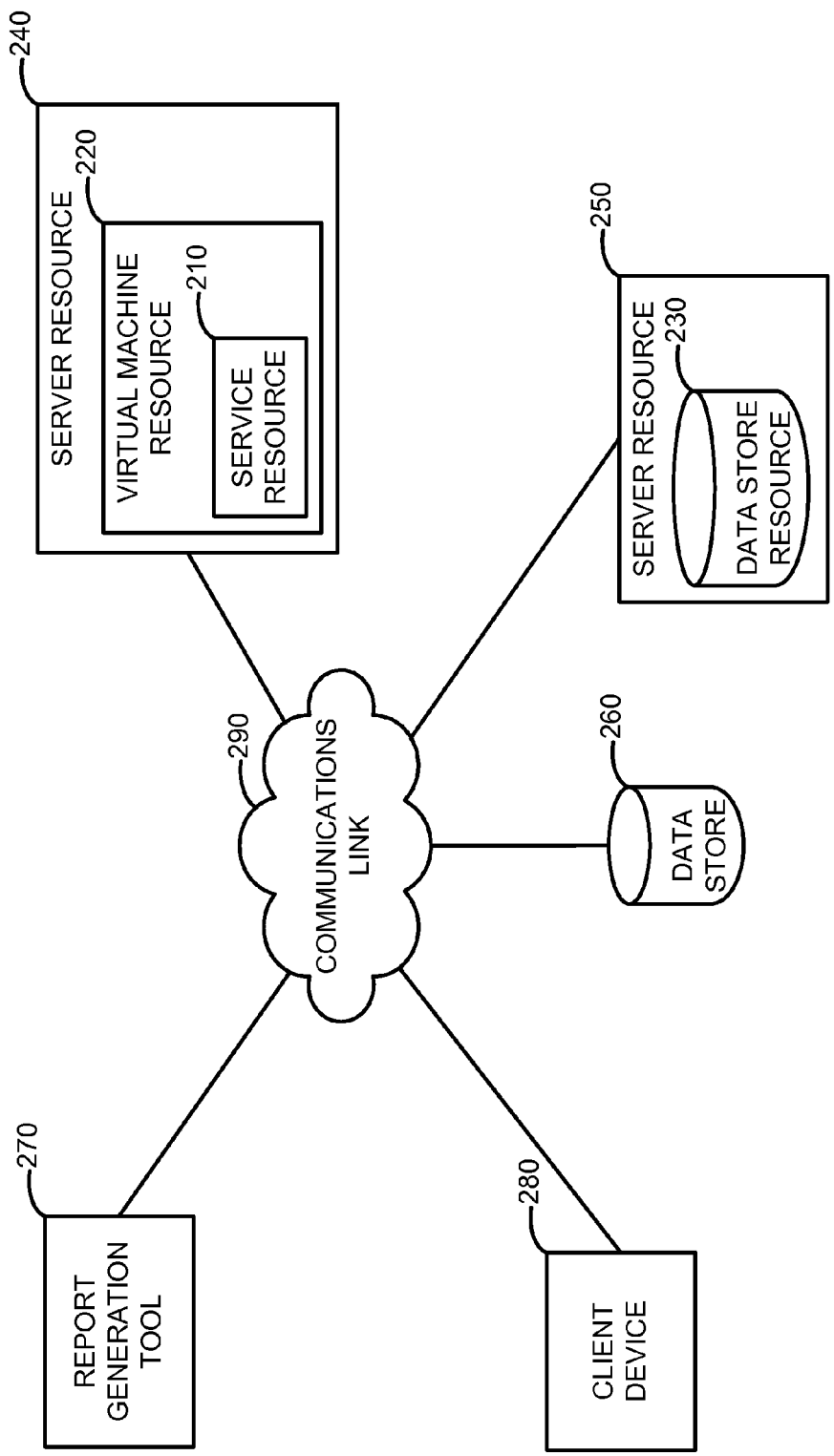
FIG. 2 is an illustration of a communications network including resources, according to an embodiment.

FIG. 2 is an illustration of a communications network including resources, according to an embodiment. The communications network of FIG. 2 includes service resource 210, virtual machine resource 220, data store resource 230, server resource 240, server resource 250, data store 260, report generation tool 270, client device 280, and communications link 290. The communications network of FIG. 2 is illustrated logically rather than physically. In other words, the placement of and connections among the resources of the communications network (e.g., client device 280, server resource 240, server resource 250, report generation tool 270, and communications link 290) represent logical relationships between the resources rather than their physical configuration. For example, report generation tool 270 and service resource 250 can be located at one physical location and client device 280 can be located at another physical location. Said differently, the placement of and connections among the resources of the communications network illustrate communication of data symbols or data signals transmitted within the system.

Figure 4:
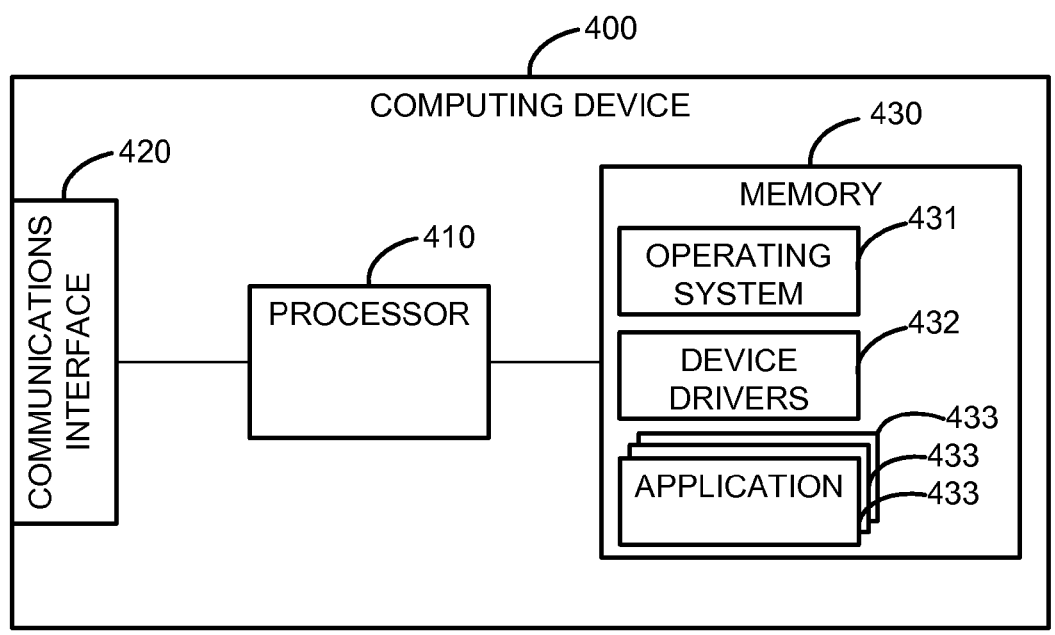
FIG. 4 is a schematic block diagram of a computing device, according to an embodiment.

Client device 280, server resource 240, and server resource 250 are computing devices such as personal computers, laptop or notebook computers, computer server (also referred to as servers), handheld computers such as personal digital assistants ("PDAs") or smartphones, media devices, and/or other computing devices. As an example of a computing device, FIG. 4 is a schematic block diagram of a computing device, according to an embodiment. As illustrated in FIG. 4, computing device 400 includes communications interface 420, processor 410, and memory 430. Processor 410 is operatively coupled to communications interface 420 and memory 430. Typically, as illustrated in FIG. 4, memory 430 includes instructions or codes (e.g., computer codes or object codes) defining software modules that are executed by processor 410 during operation of computing device 410. For example, memory 430 includes instructions that define operating system 431, device drivers 432, and applications 433 (e.g., software application programs). In other words, operating system 431, device drivers 432, applications 433, and other software modules stored as instructions (not shown) at memory 430 and executed at processor 410 are hosted at computing device 400. Applications 433 can include, for example, an application software module, a hypervisor, a virtual machine module, and/or an environment such as a runtime environment and/or virtual machine instance. As a specific example, applications 433 can include a report generation tool application and/or a service resource.

Communications interface 420 is an interface accessible to processor 410 to communicate with (i.e., transmit symbols representing data to and receive such symbols from) other processors and/or computing devices via a communications link. In other words, communications interface 420 can receive data from processor 410 and transmit symbols representing those data via a communications link. Moreover, communications interface 420 can receive symbols from other communications interfaces via a communications link and send data represented by those symbols to processor 410. For example, communications interface 420 can be a telephone network interface, a twisted-pair network interface, a coaxial network interface, a fiber-optic network interface, a wireless network interface such as a wireless local area network ("WLAN") or a cellular network, and/or some other network or communications interface.

Referring to FIG. 2, a user of report generation tool 270 accesses report generation tool 270 via client device 280. For example, client device 280 can host an Internet browser to access a web-based interface of report generation tool 270. Alternatively, client device 280 can host a software application that is in communication with and defines an interface to report generation tool 270.

Data store 260 is a data store such as a hard disk drive, a solid-state drive, a database, and/or another data storage service that is accessible to report generation tool 270. Data store 260 includes information related to, for example, relationships between, configuration of, utilization of, status of, properties of, characteristics of, statistics of, and/or other parameters of the logical and physical resources of the communications network. As a specific example, data store 260 can be a CMDB that includes information about the resources of the communications network. Report generation tool 270 can access data store 260 to determine relationships between resources (i.e., service resource 210, virtual machine resource 220, data store resource 230, server resource 240, and server resource 250) of the communications network. Alternatively, for example, report generation tool 270 can determine relationships and/or dependencies among resources within a communications network based on paths or routes of data packets within the communications network, network addresses (e.g., Internet Protocol ("IP") addresses and/or Media Access Control ("MAC") addresses) of the resource, and/or other network mapping techniques or methodologies.

Communications link 290 can include any connector and/or system that allow client service resource 210, client device 280, server resource 240, virtual machine resource 220, server resource 250, data store resource 230, data store 260, and report generation tool 270 to communicate with one another. For example, communications link 290 can be one or more of a cable (e.g., telecommunication cable, twisted-pair cable, coaxial cable, or fiber-optic cable), wireless link or connection (e.g., radio-frequency link, wireless optical link, or infrared link), or any other connector or system that supports transmission of communications symbols. Additionally, communications link 290 can include a communications network or combination of communications networks capable of transmitting information (e.g., symbols or signals representing data) such as, for example, an Ethernet network, a fiber-optic network, a wireless network, an intranet, and/or the Internet.

In some embodiments, communications link 290 can include multiple communications links and/or communications networks operatively coupled one to another by, for example, bridges, routers, switches, hubs, and/or gateways. For example, client device 280 can be operatively coupled to a cellular network (not shown) and report generation tool 270 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional communications networks. For example, the cellular network and the fiber-optic network can each be operatively coupled to the Internet such that the cellular network, the fiber-optic network and the Internet are operatively coupled to form a communications link.

Referring to FIG. 2, as discussed above, server resources 240 and 250 are physical resources such as servers within the communications network. Server resource 240 hosts virtual machine resource 220 at which service resource 210 is hosted. Virtual machine resource 220 and service resource 210 are logical resources within the communications network. Virtual machine resource 220 is a virtualized environment such as a virtual machine instance. For example, virtual machine resource 220 can be a virtual machine instance hosted at a hypervisor at server resource 240 or can be an instance of the Java Virtual Machine™. Service resource 210 is a logical resource such as a software module that provides a service that is accessible via communications link 290. For example, service resource 210 can be a web server, a database server, and/or some other service.

Data store resource 230 is a hardware module, a software module hosted at server resource 250, or a combination thereof that store data. For example, data store resource 230 can be a hard disk drive, a network attached storage ("NAS") device, a storage area network ("SAN") device, or a data storage service that is accessible via communications link 290. As a specific example, data store resource 230 can be a database instance hosted at server resource 250.

In some embodiments, two or more resources from service resource 210, virtual machine resource 220, data store resource 230, server resource 240, and server resource 250 can depend (or be dependent) on other resources from service resource 210, virtual machine resource 220, data store resource 230, server resource 240, and server resource 250. Furthermore, these resources can depend on other resources of the communications network such as communications link 290. In other words, resources can use, contain, rely on, host, be hosted by, and/or otherwise depend on other resources.

Resources that depend on one another or where at least one resource depends on other resources in the group can be referred to as related. That is, there is some dependency among related resources. Thus, for example, topological (or hierarchical) relationships can exist among resources. For example, a topological relationship can exist among physical resources and logical resources hosted at those physical resources. Moreover, for example, a topological relation can exist between a logical resource and other logical and/or physical resources at which that logical resource accesses data. As a more specific example, a relationship can exist among various resources (e.g., components or elements) of an Oracle™ instance.

Alternatively, resources that share a common characteristic such as a resource type (e.g., a class, a vendor, a model, a version, a patch level, and/or other characteristic) can be related. For example, servers that host a particular operating system, version of an operating system, or operating system with a particular patch level can be related. As another example, resources can be associated or marked with a group identifier (e.g., marked with a tag or tagged with a unique value) that indicates that these resources are related. For example, a table in a database can include a column for identifiers of resources and one or more columns for group identifiers associated with each resource. A system administrator of an information system can store a group identifier (e.g., a value that uniquely identifies a group of resources within an information system) in a group identifier column at rows of the table corresponding to resources that should be related (or grouped). A report generation tool can access this table to determine which resources are related to a resource by accessing the identifiers of resources that have a group identifier of that resource (i.e., have a group identifier that is stored at a group identifier column on a row of the table associated with that resource). Thus, relationships can be defined by a user such as a systems administrator. This can also be useful to address particular use cases such as analysis flows or processes to diagnose operational problems within information systems. For example, a user of a report generation tool might typically generate a set of reports for a group of resources when diagnosing a particular operational problem. Each of these resources can be tagged such that when a report for one of those resource is requested, that report includes reference to each of the other reports. In other words, a set of related (or associated) reports can be defined by tagging the resources associated with those reports. In some embodiments, the group identifier can also identify a particular report type of class that should be generated for resource associated with that tag or group identifier.

Figure 3:
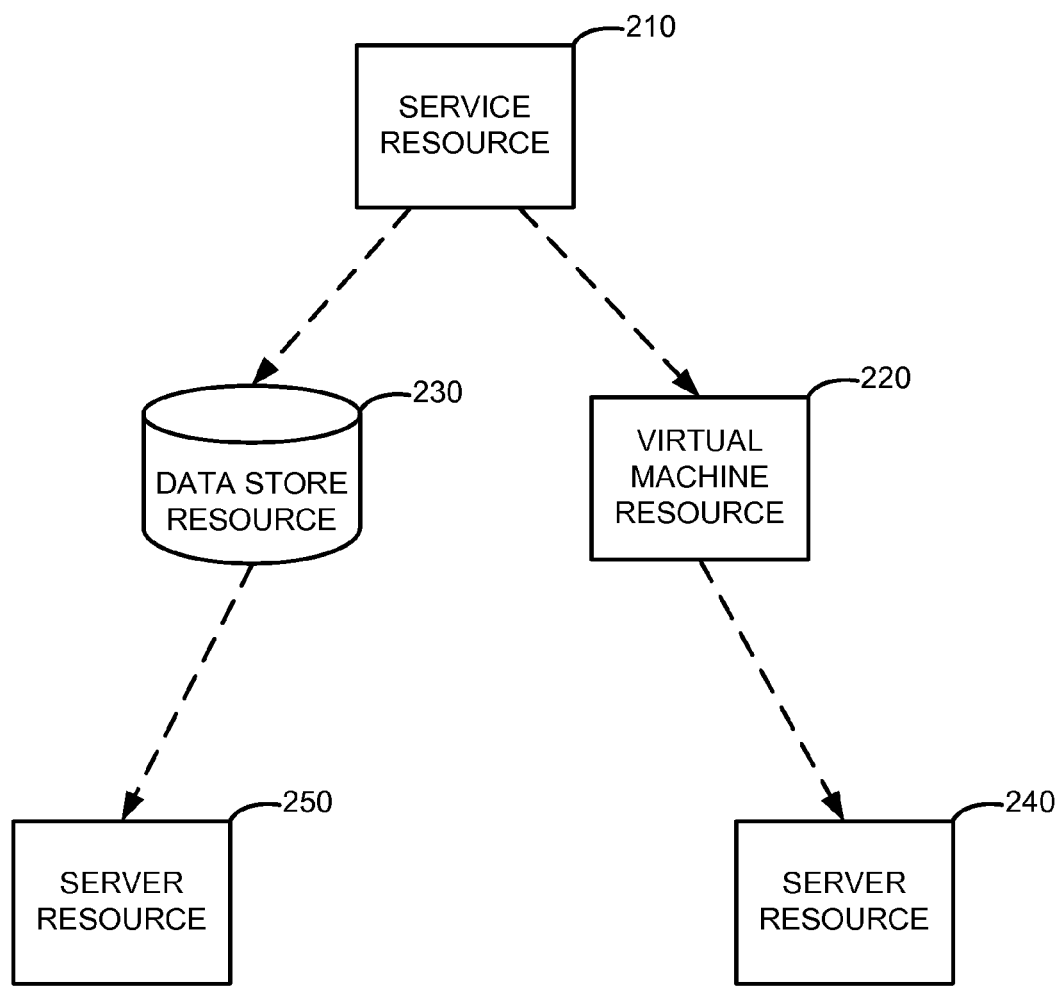
FIG. 3 is an illustration of relationships among the resources illustrated in FIG. 2, according to an embodiment.

As an example of relationships between resources, FIG. 3 is an illustration of relationships among the resources illustrated in FIG. 2, according to an embodiment. As illustrated in FIG. 3, service resource 210 depends on virtual machine resource 220 because service resource 210 is hosted at virtual machine resource 220. Similarly, virtual machine resource 220 is hosted at server resource and, therefore, depends on server resource 240. Accordingly, service resource 210 also depends on server resource 240.

Additionally, service resource 210 accesses data (or exchange with) at data store resource 230 and, thus, depends on data store resource 230. Moreover, data store resource 230 is hosted at server resource 250 and, therefore, depends on server resource 250. Service resource 210 depends on server resource 250 because data store resource 230 depends on server resource 250.

Referring to FIG. 2, report generation tool 270 generates reports associated with the resources of the communications network. That is, report generation tool 270 generates reports associated with one or more of service resource 210, virtual machine resource 220, data store resource 230, server resource 240, and server resource 250. Moreover, report generation tool 270 embeds references to reports associated with the resources that depend on or are related to the resources for which the reports are generated. In other words, report generation tool 270 adds report references to the reports generated at report generation tool 270.

Figure 5:
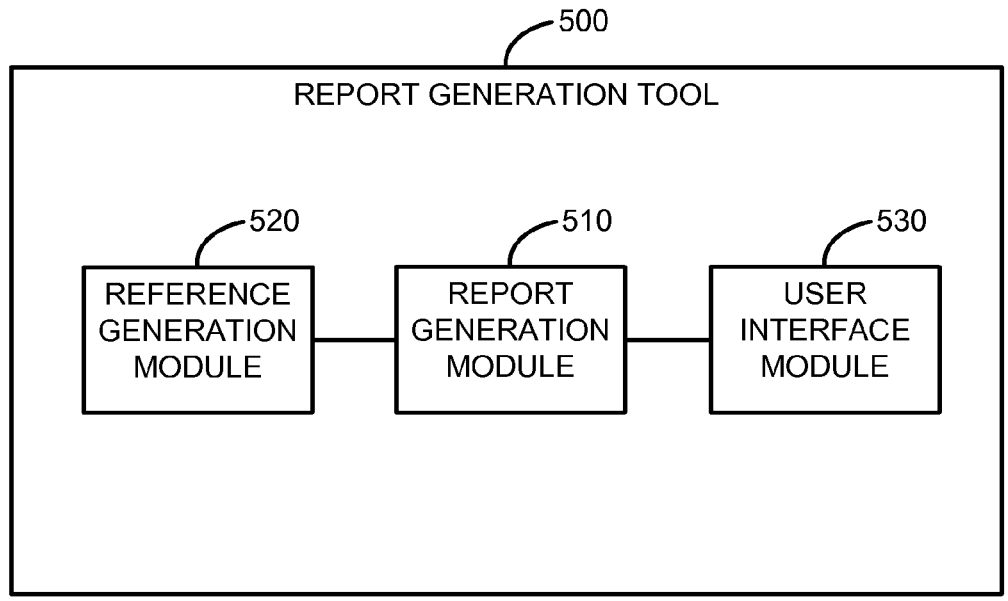
FIG. 5 is a schematic block diagram of a report generation tool, according to an embodiment.
Figure 6:
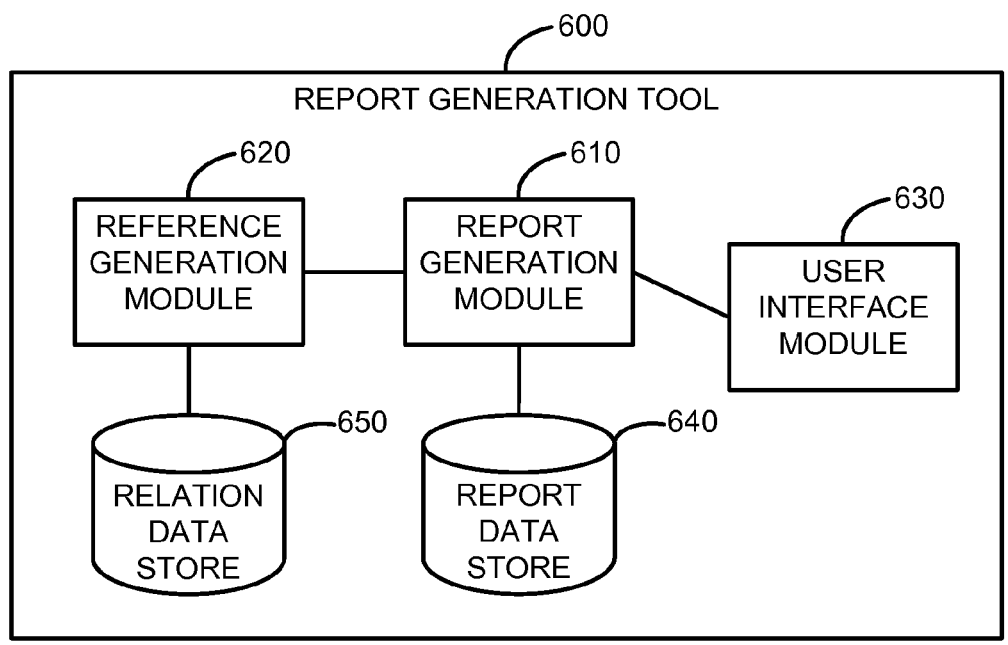
FIG. 6 is a schematic block diagram of a report generation tool, according to another embodiment.

Report generation tool 270 is a hardware module, a software module hosted at a computing device, and/or a combination thereof and includes modules or engines to generate reports and embed references to related reports within those reports. FIGS. 5 and 6 illustrate embodiments of report generation tools.

FIG. 5 is a schematic block diagram of a report generation tool, according to an embodiment. Report generation tool 500 includes report generation module 510, reference generation module 520, and user interface module 530. Each of report generation module 510, reference generation module 520, and user interface module 530 is a hardware module, a software module hosted at a computing device, and/or a combination thereof. For example report generation tool 500 can be a virtual machine hosted at a computing device and report generation module 510, reference generation module 520, and user interface module 530 can each be software module hosted at the virtual machine. Alternatively, for example, report generation tool 500 can be a server and report generation module 510, reference generation module 520, and user interface module 530 can be hosted at the server.

Report generation module 510 accesses values related to utilization, status, properties, characteristics, statistics, and/or other parameters of logical and physical resources within an information system and generates one or more reports based on those values. That is, report generation module 510 accesses values associated with a resource to generate (or define) a report for that resource. For example, software modules hosted within a communications network can communicate with the logical and physical resources and populate tables in one or more databases such as a CMDB with values related to utilization, status, properties, characteristics, statistics, and/or other parameters of those logical and physical resources, and report generation module 510 accesses the values related to utilization, status, properties, characteristics, statistics, and/or other parameters of a resource at the one or more databases based on an identifier of that resource. In some embodiments, report generation module 510 accesses the values related to utilization, status, properties, characteristics, statistics, and/or other parameters of a resource directly at that resource based on, for example, an identifier of that resource. Report generation module 510 then includes these accessed values and/or values derived from the accessed values within a report that is provided for the user.

Reports generated at report generation module 510 can include a text section and/or a graphic section. The text section can include information presented in as text (e.g., letters, numbers, and/or symbols) such as, for example, minimum values, maximum values, averages over various time periods (e.g., daily, weekly, and/or monthly averages), values representing statistical analysis results (e.g., a median value, a standard deviation value, and/or values representing a probability distribution) based on the accessed values. In some embodiments, the text section can be formatted based on a template or profile accessible to report generation module 510. In some embodiments, the text section can be formatted based on formatting instructions or commands provided by a user in a report request. That is, a user can provide instructions that describe a desired format of the text section in (or with) a request for a report.

The graphic section can include information presented in a graphic format such as, for example, charts, graphs, and/or plots based on the accessed values. In some embodiments, the graphic section can be formatted based on a template or profile accessible to report generation module 510 that describes the content and placement of the graphic section. In some embodiments, the graphic section can be formatted based on formatting instructions or commands provided by a user in a report request. That is, a user can provide instructions that describe the content and placement of the graphic section.

Reference generation module 520 identifies (or determines) resources that are related to a resource for which a report is generated at report generation module 510. For example, reference generation module 520 can access a database including dependency or relationship data related to resources within a communications network. More specifically, reference generation module 520 can access at that database a group of identifiers of resources related to a resource based on an identifier of that resource. Reference generation module 520 can then generate a reference to a report for one or more resources related to that resource. For example, reference generation module 520 can generate a URI, a group of instructions, or some other designation of a particular report. As a more specific example, a reference to a report can include a URI of report generation tool 500 and a group of arguments (e.g., name/value pairs) that identify a report of a resource. Thus, when the reference is selected, the URI can provided to report generation tool 500, and report generation tool 500 can interpret the URI and arguments to determine which report should be generated at report generation module 510.

In some embodiments, the context of a report and/or resource can be included in the reference as a context identifier. For example, arguments included within a reference can include information related to a context of a report. More specifically, for example, the arguments can include a value that describes a range or period of time for which the report was generated and/or an identifier of a report type or class of the report.

Moreover, reference generation module 520 can generate a reference to a report of a particular report type of class for a resource related to a resource for which a report was requested. That is, multiple report types or classes that each include different information and/or arrangements of information can be generated at report generation module 510, and reference generation module 520 can generate a reference to a report of a particular report type of class for a resource related to a resource for which a report was requested. For example, the report request can include an identifier of a report type or class and reference generation module 520 can generate a reference to a report of that report type or class for a resource related to a resource for which a report was requested. Alternatively, for example, relationships between report types and/or classes can be defined at report generation tool 500 or a database accessible to report generation tool 500, and reference generation module 520 can determine based on one or more of those relationships which report type or class the reference should identify and generate a reference to a report of that report type or class for a resource related (a related resource) to a resource for which a report was requested.

Reference generation module 520 also embeds (or inserts or includes) the reference to the report for the related resource or the references to the reports for the related resources within the requested report. In some embodiments, reference generation module 520 accesses the requested report generated by report generation module 510 and embeds the reference to the report for the related resource. In some embodiments, reference generation module 520 embeds the reference to the report for the related resource by providing the reference to the report for the related resource to report generation module 510, and report generation module 510 includes the reference to the report for the related resource in the requested during generation of that report or after that report is generation by report generation module 510.

User interface module 530 defines an interface via which users or clients of report generation tool 500 interact with report generation tool 500. That is, user interface module 530 receives report requests from users and provides those report requests (or portions thereof) to report generation module 510 and/or reference generation module 520. Report generation module 510 and/or reference generation module 520 generate a report and references to reports for related resources, respectively, and user interface module provides the requested report for the user. For example, user interface module 530 can define a GUI or a CLI via which users can request reports for resources and/or receive the requested reports. As a specific example, user interface module 530 can be a web-based interface and a user can access user interface module 530 via a client such as an Internet browser.

FIG. 6 is a schematic block diagram of a report generation tool, according to another embodiment. Report generation tool 600 includes report generation module 610, reference generation module 620, user interface module 630, report data store 640, and relation data store 650. Each of report generation module 610, reference generation module 620, and user interface module 630 is a hardware module, a software module hosted at a computing device, and/or a combination thereof. For example report generation tool 600 can be a virtual machine hosted at a computing device and report generation module 610, reference generation module 620, and user interface module 630 can be software module hosted at the virtual machine and report data store 640 and relation data store 650 can be accessible to that virtual machine. Alternatively, for example report generation tool 600 can be a server and report generation module 610, reference generation module 620, user interface module 630, report data store 640, and relation data store 650 can be hosted at the server. Report data store 640 and relation data store 650 are data stores such as hard disk drives, solid-state drives, databases, and/or another data storage services that are included within or are accessible to report generation tool 600.

Report generation module 610, reference generation module 620, and user interface module 630 are similar to generation module 510, reference generation module 520, and user interface module 530, respectively, discussed above in relation to FIG. 5. Report data store 640 is accessible to report generation module 610 and includes reports or report templates report generation module 610 can access in response to report requests. For example, report generation module 610 can store (or cache) reports at report data store 610 and access those reports when those reports are requested. Thus, a report can be generated by accessing the values that should be included within the report in response to a report request as discussed above in relation to FIG. 5, or can be generated by accessing a cached report at report data stored 640.

In some embodiments, report data store 610 can include report templates that define the formatting of reports. Thus, report generation module 610 can access report data store 640 to access instructions or directives related to the formatting of a report. Reference generation module 620 can access report data store 610 to determine which resources are related to a resource for which a report request was received. More specifically, reference generation module 620 can access at report data store 610 a group of identifiers of resources related to a resource based on an identifier of that resource.

Relation data store 650 includes information related to relationships between resources within, for example, a communications network. That is, relation data store 650 includes information than describes dependencies among resources (i.e., which resources depend on which other resources). Moreover, the functionalities of the various modules of report generation tools 500 and 600 can be aggregated and/or further distributed. Thus, report generation tools 500 and 600 can include more or fewer modules (or components) than illustrated in FIGS. 5 and 6.

Referring to FIG. 2, a user can thus access report generation tool 270 via client device 280 and request a report related to service resource 210. In response to the report request, report generation tool 270 accesses values related to utilization, status, properties, characteristics, statistics, and/or other parameters of service resource 210 at data store 260 and/or at service resource 210 via communications link 290 and generates a report based on those values. Additionally, report generation tool 270 generates references to reports associated with virtual machine resource 220, server resource 240, data store resource 230, and server resource 250 and embeds these references at the generated report. The report is then provided for the user via client device 280. The user can then select one of the references to request the report identified by that reference. In other words, a report request based on the reference is provided to report generation tool 270 in response to selection of that reference by the user. That report is then generated at report generation tool 270, references to resources related to the resource associated with that report are embedded within that report, and that report is provided for the user via client device 280.

Figure 7:
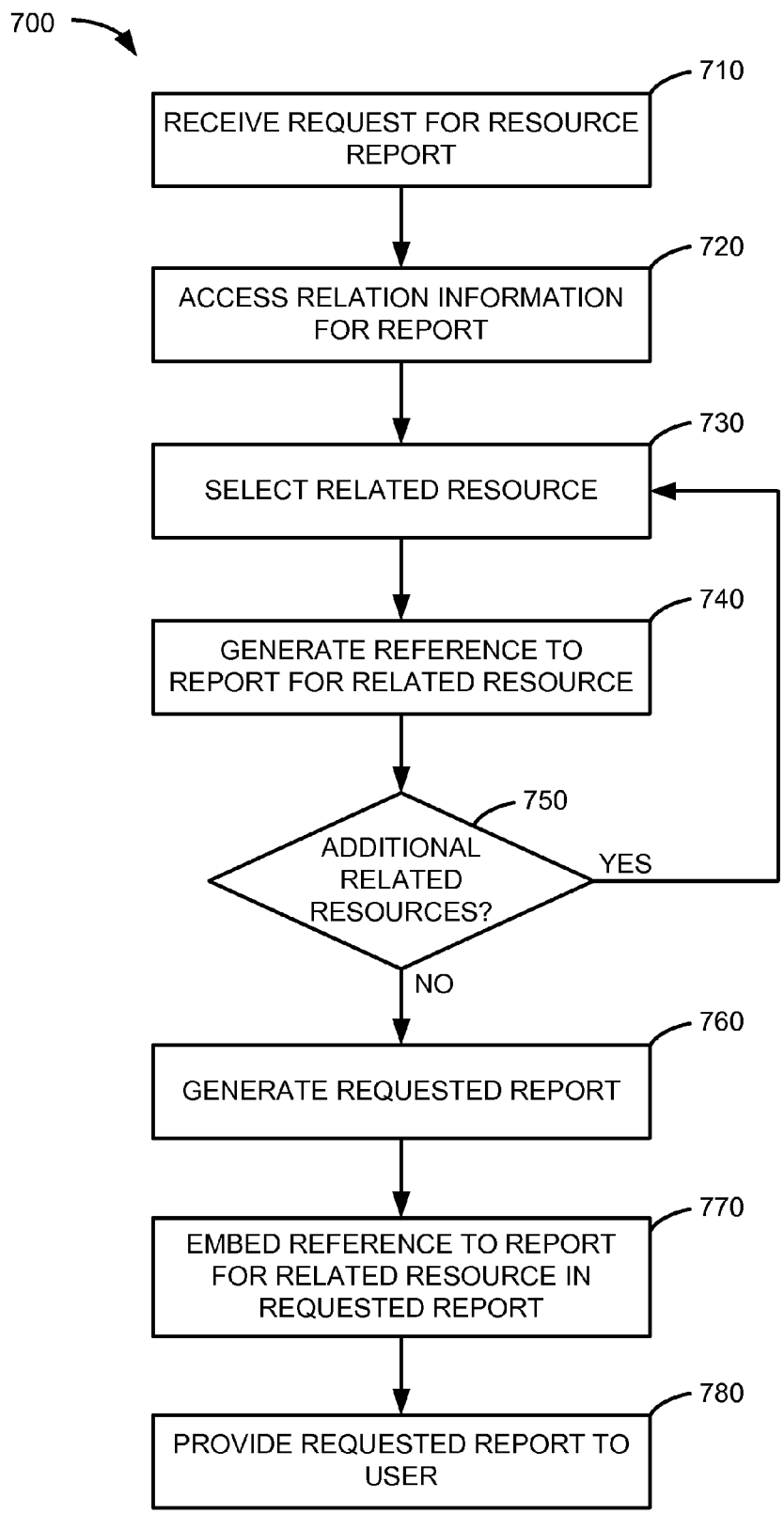
FIG. 7 is a flowchart of a process to generate a report including a reference to a related report, according to an embodiment.

FIG. 7 is a flowchart of a process to generate a report including a reference to a related report, according to an embodiment. Process 700 can be implemented as a hardware module, as a software module hosted at a computing device, and/or as a combination of a hardware module and a software module. For example, process 700 can be implemented as application-specific circuitry or as a software module including instructions stored at a memory and executed at a processor in communication with the memory. More specifically, for example, process 700 can be implemented at a computing device within a communications network.

A request for a report related to a resource is received at block 710 and relation information for that report is accessed at block 720. That is, information identifying resources related to the resource for which the report was requested is accessed at block 720 in response to the report request received at block 710. As discussed above, for example, the report request can include an identifier of the requested report or a resource associated with the requested report and that identifier can be used, for example, as a key to access or identify resources that are related to the report or resource associated with the requested report (e.g., resources that depend on the resource associated with the requested report or on which the resource associated with the requested report depends). The resources identified can be referred to as related resources.

One of the related resources is selected at block 730 and a reference to a report for that related resource is generated at block 740. If there are additional related resources (i.e., related resources for which a reference to a report has not been generated) at block 750, process 700 can return to block 730 and another related resource is selected at block 730. If there are no additional related resources at block 750, process 700 proceeds to block 760 at which the requested report is generated. As discussed above, a requested report can be generated by accessing values related to utilization, status, properties, characteristics, statistics, and/or other parameters of a resource at a data store (i.e., indirectly) or at that resource (i.e., directly). Alternatively, a requested report can be generated by accessing the requested report at a report data store. In some embodiments, a requested report can be formatted according to a template and/or instructions included within the report request received at block 710.

The report reference or references generated at block 730, 740, and 750 are embedded (or included) within the requested report at block 770. For example, the requested report can be defined using HTML as a web page and instructions based on scripting language such as JavaScript™ or HTML codes including the report reference or references can be included within the requested report to embed the report reference or references in the requested report. As a more specific example, the report reference or references can be URIs (e.g., hyperlinks) that are included within a list box defined by JavaScript™ instructions embedded within the requested report.

The requested report is then provided for the user at block 780. For example, the requested report can be sent to the user (or a client device or client software application via which the user is accessing the report generation tool) or can be stored at a location at which the user can access the requested report. More specifically, for example, the requested report can be sent directly to an Internet browser at which the user can view the requested report. Alternatively, for example, the requested report can be stored at a data store and a URI of the requested report can be provided for the user. As a specific example, a URI of the requested report and a redirect instruction can be sent to an Internet browser such that the Internet browser accesses the requested report via the URI. In yet another alternative, the requested report is provided for the user (e.g., is stored) at a location (e.g., a file at a data store identified by a URI) that is known to the user (or a client device or client software application via which the user is accessing the report generation tool) and the user accesses the requested report at that location. As discussed above, after the requested report is provided for the user at block 780, the user can request the report associated with a related resource by selecting the reference to the report associated with the related resource at the report.

Process 700 can include addition or fewer blocks than those illustrated in FIG. 7. For example, process 700 can include a block to determine whether a reference should be generated for a related resource selected at block 730. For example, a report generation tool can be configured to generate references to reports of related resources for only a particular type of related resource. More specifically, for example, a report generation tool can generate references to reports of physical related resources and not generate references to reports of logical related resources. Alternatively, for example, a report request can include identifier of report types of classes and references to reports of those report types or classes are embedded at the report requested by that report request. This identifier can be included within a context identifier of the request report such that reference to those report types or classes are included at the requested report if the requested report is later requested based on selection of a reference to the requested report at another report. Additionally, one or more blocks can be rearranged. Furthermore, although process 700 is discussed above with reference to an example environment within a communications network, process 700 is applicable within other environments.

Figure 8B:
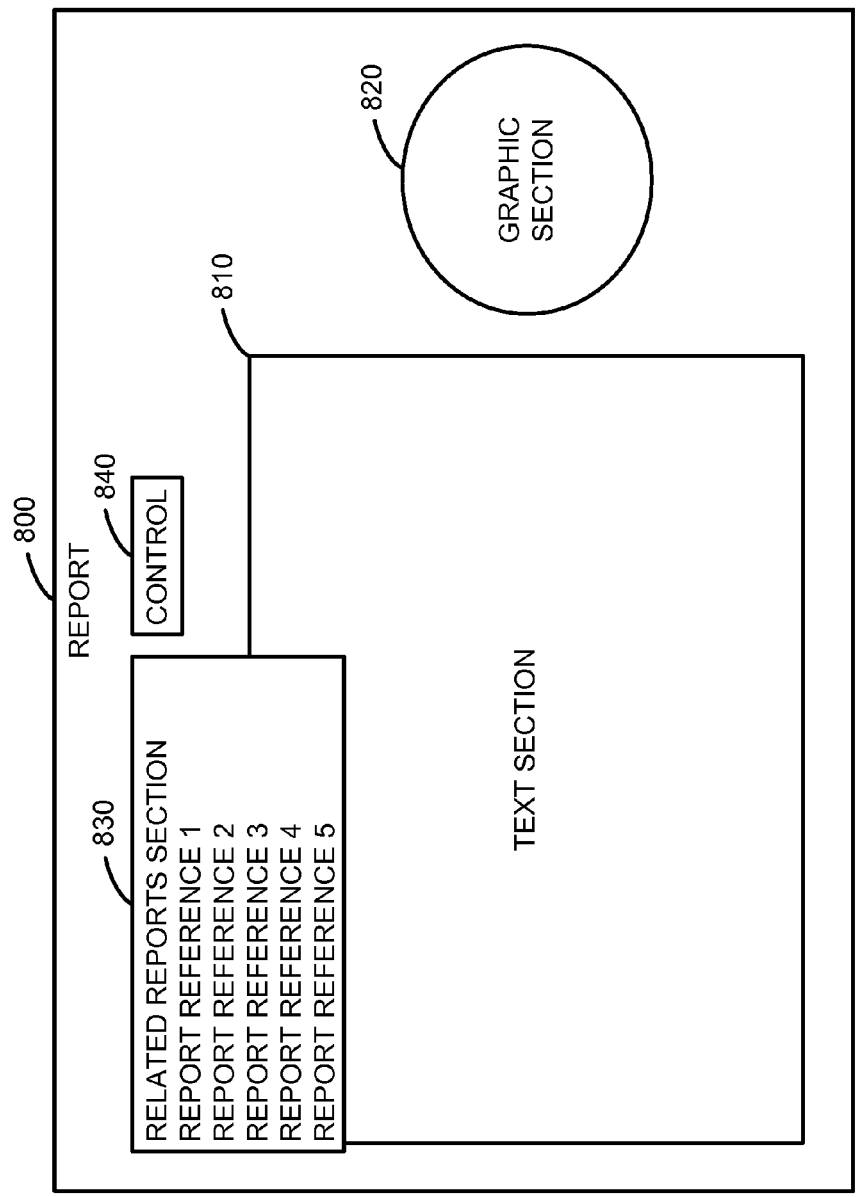

FIGS. 8A and 8B are illustrations of a report, according to an embodiment. Report 800 is a representation of utilization, status, properties, characteristics, statistics, and/or other parameters of a resource and can be defined using a variety of methodologies. For example, report 800 can be an image file, a word processing file, or some other file such as a Portable Document Format ("PDF") file. Alternatively, for example, report 800 can be a group of values and/or images and/or references to values and/or images. For example, report 800 can be an Extensible Markup Language ("XML") document, and HTML document, and/or a combination thereof.

Report 800 can be displayed, for example, at a client device such as a personal computer hosting an Internet browser. Alternatively, for example, report 800 can be displayed at a handheld computing device such as a smartphone hosting a software application that communicates with a report generation tool and is configured to display report 800 or values and/or graphics included within report 800.

As illustrated in FIGS. 8A and 8B, report 800 includes text section 810 and graphic section 820. In some embodiments, report 800 can exclude a text section or a graphic section and/or include multiple text sections and/or graphic sections. Report 800 also includes related reports section 830 and control 840. As illustrated in FIGS. 8A and 8B, related reports section 830 is a drop-down list box that includes references to related reports and is controlled by control 840. That is, when control 840 is selected, related reports section 830 expands as illustrated in FIG. 8B such that the references to reports included within related reports section 830 are accessible. Related reports section 830 includes references to reports labeled REPORT REFERENCE 1, REPORT REFERENCE 2, REPORT REFERENCE 3, REPORT REFERENCE 4, and REPORT REFERENCE 5, each of which is associated with a resource that is related to the resource associated with report 800. In some embodiments, related reports section 830 can be a static list or group of reference to related reports.

A user can select REPORT REFERENCE 1, REPORT REFERENCE 2, REPORT REFERENCE 3, REPORT REFERENCE 4, or REPORT REFERENCE 5 to request a report for a resource related to the resource associated with report 800. That is, when the user selects REPORT REFERENCE 1, REPORT REFERENCE 2, REPORT REFERENCE 3, REPORT REFERENCE 4, or REPORT REFERENCE 5, a report generation tool receives a request for a report identified by the selected reference, generates that report, and provides that report for the user. In other words, each of REPORT REFERENCE 1, REPORT REFERENCE 2, REPORT REFERENCE 3, REPORT REFERENCE 4, or REPORT REFERENCE 5 is uniquely associated with a resource or report associated with a resource. Thus, the user can navigate among reports using references to related reports included at each report.

Figure 9:
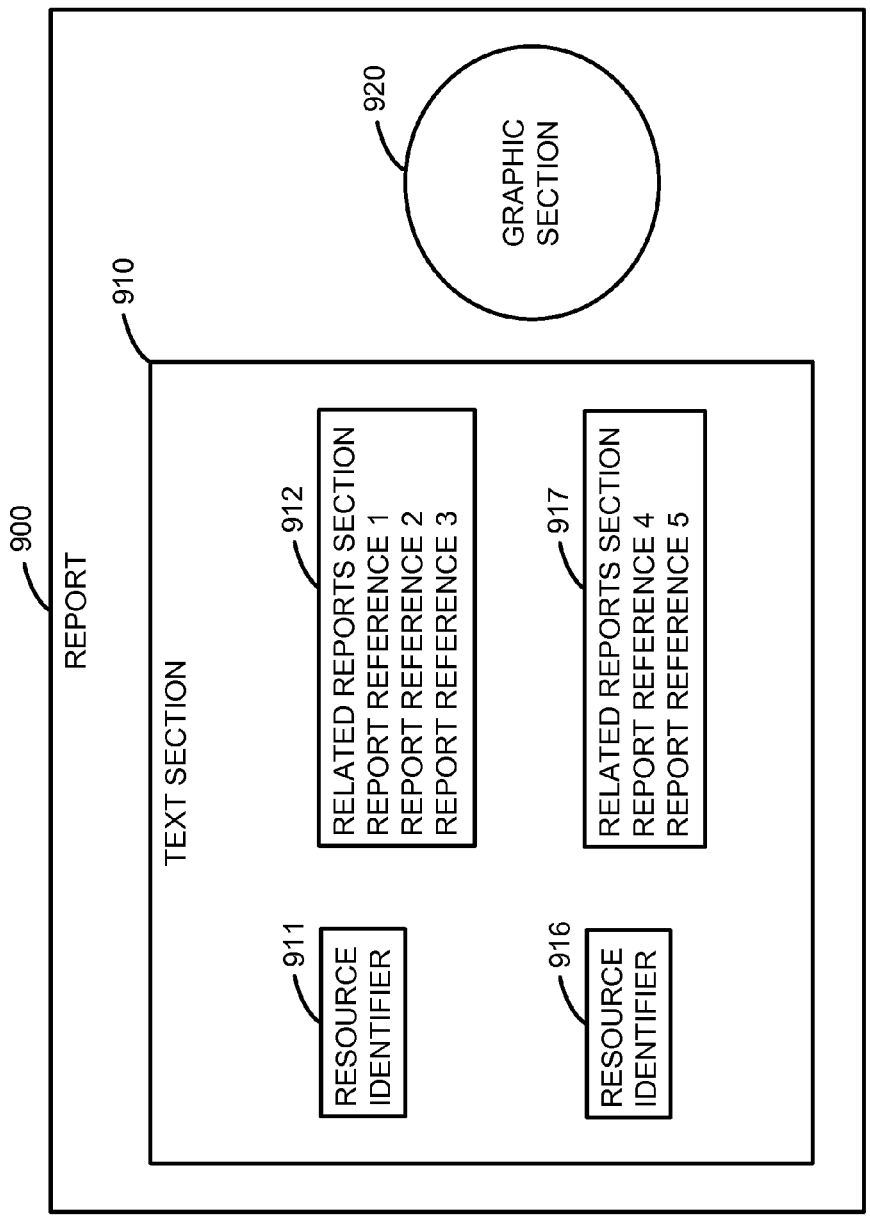
FIG. 9 is an illustration of a report, according to an embodiment.

FIG. 9 is an illustration of a report, according to an embodiment. Report 900 is similar to report 800 discussed above in relation to FIGS. 8A and 8B and is a representation of utilization, status, properties, characteristics, statistics, and/or other parameters of a resource and can be defined using a variety of methodologies. For example, report 900 can be an image file, a word processing file, or some other file such as a Portable Document Format ("PDF") file. Alternatively, for example, report 900 can be a group of values and/or images and/or references to values and/or images. For example, report 1100 can be an Extensible Markup Language ("XML") document, and HTML document, and/or a combination thereof.

Report 900 can be displayed, for example, at a client device such as a personal computer hosting an Internet browser. Alternatively, for example, report 900 can be displayed at a handheld computing device such as a smartphone hosting a software application that communicates with a report generation tool and is configured to display report 900.

As illustrated in FIG. 9, report 900 includes text section 910 and graphic section 920. In some embodiments, report 900 can exclude a text section or a graphic section and/or include multiple text sections and/or graphic sections. Text section 910 and graphic section 920 are similar to text section 810 and graphic section 820, respectively, discussed above in relation to FIGS. 8A and 8B.

As illustrated in FIG. 9, text section 910 includes information related to multiple resources. More specifically, text section 910 includes information related to the resources identified by resource identifiers 911 and 916. Related reports section 912 is associated with resource identifier 911. That is, REPORT REFERENCE 1, REPORT REFERENCE 2, and REPORT REFERENCE 3 included in related reports section 912 are references to reports that are related to the resource identified by resource identifier 911. In other words, report references can be references to reports for different resources as discussed above, or can be reference to different report for a common resource. That is, REPORT REFERENCE 1, REPORT REFERENCE 2, and REPORT REFERENCE 3 can be reference to different reports (e.g., reports of different types or based on different templates) than report 900. Said differently, report references included in a report can be related to (or associated with) that report because the resource for which that report was generated is related to the resources associated with the reports referenced by the report references, and/or because the reports associated with the report references are for that same resource for which that report was generated. Related reports section 917 is similarly related to resource identifier 916.

Thus, a user can select, for example, REPORT REFERENCE 4 within related reports section 917 of text section 910 at report 900 to access another report related to the resource identified by resource identifier 916. Similarly, for example, a user can select REPORT REFERENCE 2 within related reports section 912 of text section 910 at report 900 to access another report related to the resource identified by resource identifier 911. Thus, a report can include report references related to multiple resources. Moreover, although report references are illustrated within text section 910, report references can also be included within graphic section 920. For example, icons or graphs related to resources can be displayed within graphic section 920. A user can select, for example, an icon to access a list of report reference for the resource associated with that icon and select a report reference from that list to access a different report for that resource.

Figure 10:
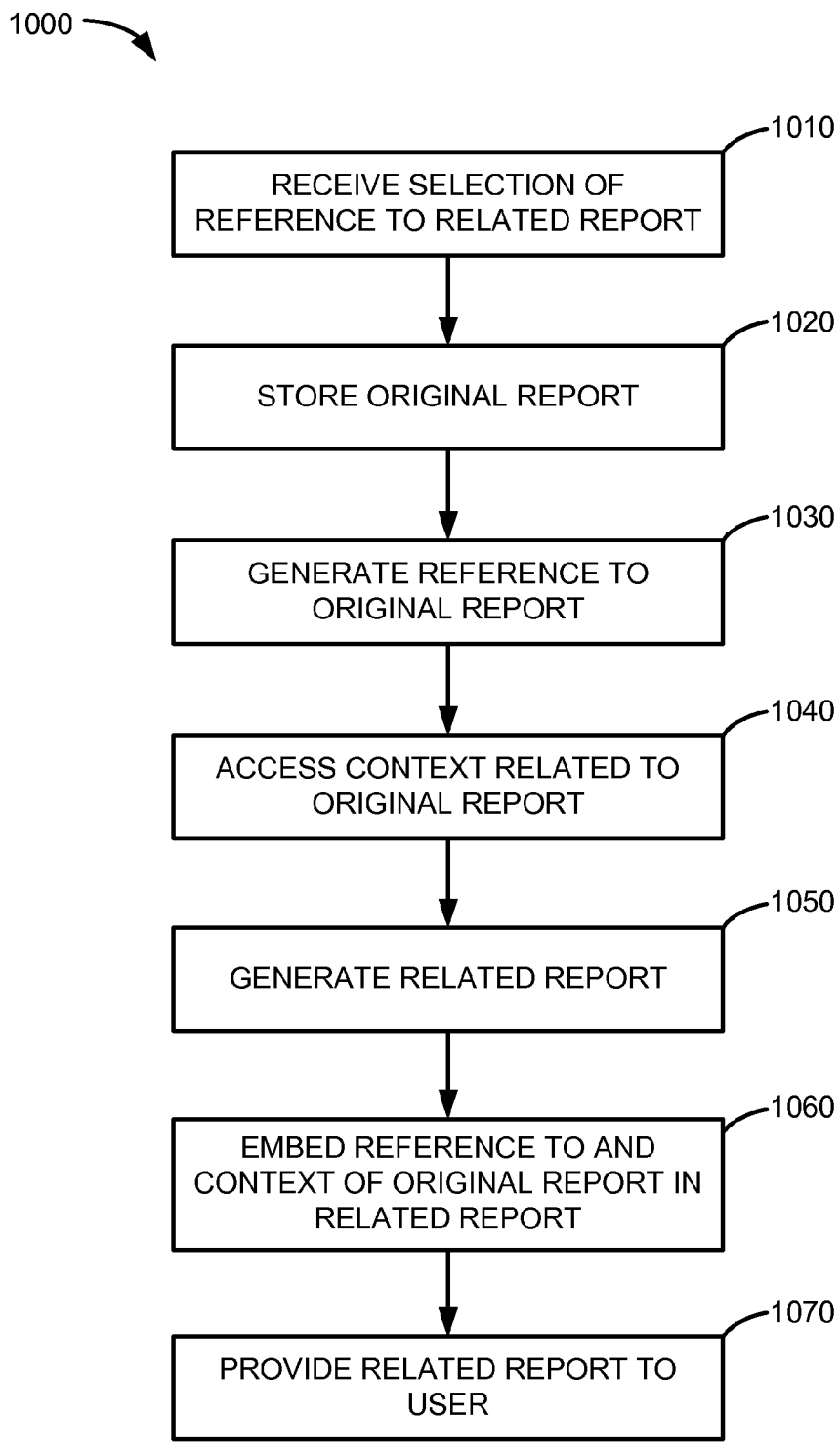
FIG. 10 is a flowchart of a process to generate a related report including a reference to a report based on a selection of a reference to the related report at the report, according to an embodiment.

FIG. 10 is a flowchart of a process to generate a related report including a reference to a report based on a selection of a reference to the related report at the report, according to an embodiment. Process 1000 can be implemented as a hardware module, as a software module hosted at a computing device, and/or as a combination of a hardware module and a software module. For example, process 1000 can be implemented as application-specific circuitry or as a software module including instructions stored at a memory and executed at a processor in communication with the memory. More specifically, for example, process 1000 can be implemented at a computing device within a communications network.

A selection of a reference to a related report (i.e., a reference to a report embedded within another report) is received at block 1010. In other words, a request for a report is received in response to selection of a reference to that report stored at another report (the original report as discussed in relation to FIG. 10) is received at a report generation tool at block 1010. The original report is stored at block 1020. For example, the original report can be stored at a report data store or cache for later access.

A reference to the original report is generated at block 1030. The reference to the original report can indicate that the original report was stored at, for example, a cache or can merely identify the original report. For example, the reference to the original report can include an identifier of a resource associated with the original report and an identifier of a report type of the original report. Additionally, context related to the original report can be accessed at block 1040. The context can be specified or described in a context identifier including an identifier of a period of time for which the original report was generated, an identifier of or reference to a report that included a reference to the original report, and/or references to other reports (i.e., reports that were generated before the original report that are associated with resources to which the resource associated with the original report is related).

The related report (i.e., the report for which a report request was received at block 1010) is then generated at block 1050 and the reference to and/or context identifier of the original report are embedded within the related report. Thus, the reference to the original report and the context of the original report are available at the related report. Accordingly, a user can navigate to the original report from the related report without accessing a report selection interface of a report generation tool. Moreover, the context of the original report can be provided to a report generation tool from the related report (e.g., as a context identifier in response to selection of the reference to the original report at the related report) and the report generation tool can use the context to generate the original report as the original report was generated when the original report first generated. Furthermore, the context of the original report can be provided to the report generation module (i.e., by a user or a client device) and accessed during generation of the related report (or other reports) to select values used to generate the related report. In other words, the context of the original report can be used at the report generation tool to determine which values are included within the related report such that the related report has the same or a similar context to the context of the original report.

After the related report is generated, the related report is provided for the user at block 1070. For example, the related report can be sent to the user (or a client device or client software application via which the user is accessing the report generation tool) or can be stored at a location at which the user can access the related report. More specifically, for example, the related report can be sent directly to an Internet browser at which the user can view the related report. Alternatively, for example, the related report can be stored at a data store and a URI of the related report can be provided for the user. In yet another alternative, the related report is provided for the user (e.g., is stored) at a location (e.g., a file at a data store identified by a URI) that is known to the user (or a client device or client software application via which the user is accessing the report generation tool) and the user accesses the related report at that location.

Process 1000 can include addition or fewer blocks than those illustrated in FIG. 10. Additionally, one or more blocks can be rearranged or discarded. For example, process 1000 can not store the original report at block 1020 and, thus, block 1020 can be excluded. Furthermore, although process 1000 is discussed above with reference to an example environment within a communications network, process 1000 is applicable within other environments.

Figure 11:
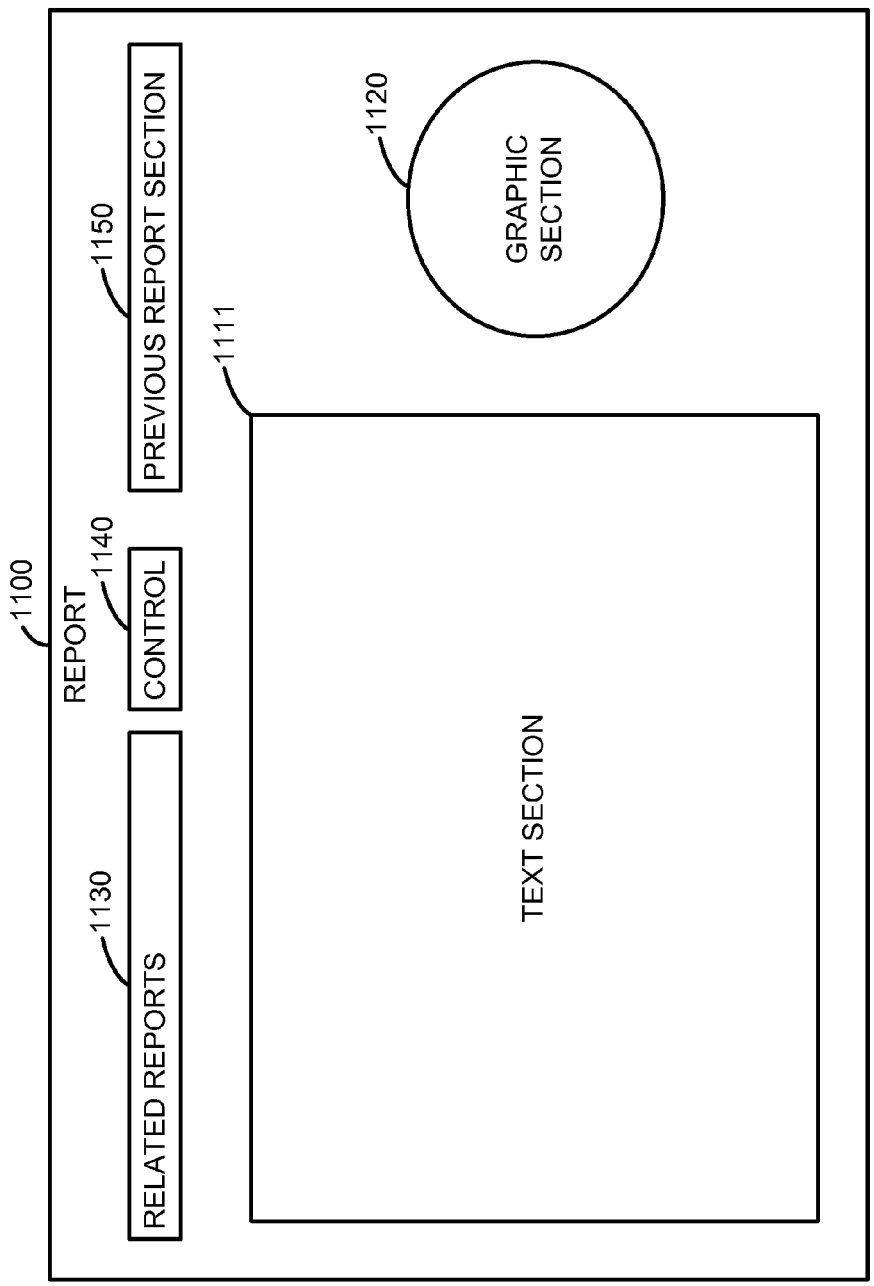
FIG. 11 is an illustration of a report, according to an embodiment.

FIG. 11 is an illustration of a report, according to an embodiment. Report 1100 is similar to report 800 discussed above in relation to FIGS. 8A and 8B and is a representation of utilization, status, properties, characteristics, statistics, and/or other parameters of a resource and can be defined using a variety of methodologies. For example, report 1100 can be an image file, a word processing file, or some other file such as a Portable Document Format ("PDF") file. Alternatively, for example, report 1100 can be a group of values and/or images and/or references to values and/or images. For example, report 1100 can be an Extensible Markup Language ("XML") document, and HTML document, and/or a combination thereof.

Report 1100 can be displayed, for example, at a client device such as a personal computer hosting an Internet browser. Alternatively, for example, report 1100 can be displayed at a handheld computing device such as a smart-phone hosting a software application that communicates with a report generation tool and is configured to display report 1100.

As illustrated in FIG. 11, report 1100 includes text section 1110 and graphic section 1120. In some embodiments, report 1100 can exclude a text section or a graphic section and/or include multiple text sections and/or graphic sections. Report 1100 also includes related reports section 1130 and control 1140. Text section 1110, graphic section 1120 related reports section 1130, and control 1140 are similar to text section 810, graphic section 820 related reports section 830, and control 840, respectively, discussed above in relation to FIGS. 8A and 8B.

Additionally, report 1100 includes previous report section 1150. Previous report section 1150 includes references to reports that were previously generated. For example, in reference to FIG. 10 discussed above, report 1100 can be the related report and a reference to the original report is included at previous report section 1150. In other words, previous report section 1150 includes references to reports that were previously generated via which a user can access the previously accessed reports. In some embodiments, the references included at previous report section 1150 include context of the referenced reports. The context can be provided to a report generation tool when those references are selected such that the reports associated with the selected references are provided for the user in the same form (e.g., same layout and values) as when those reports were initially received by the user. Thus, the references included within previous report section 1150 allow the user to retrace his or her steps in navigating among the reports to, for example, diagnose an operational problem.

In some embodiments, previous report section 1150 can be a drop-down list box that includes references to related reports and is controlled by a control (not shown). That is, when the control (not shown) is selected, previous report section 1150 expands such that the references to previously generated reports included within previous report section 1150 are accessible (i.e., are visible and/or can be selected). Moreover, report 1100 and/or report 800 discussed above in relation to FIGS. 8A and 8B can include additional sections and/or controls. For example, a report can include a section that indicates a number of related reports, a name of a report, and/or an explanation of the contents (e.g., sections) of that report. As another example, a report can include a refresh control that when selected by a user requests that that report be updated with current values.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 12:
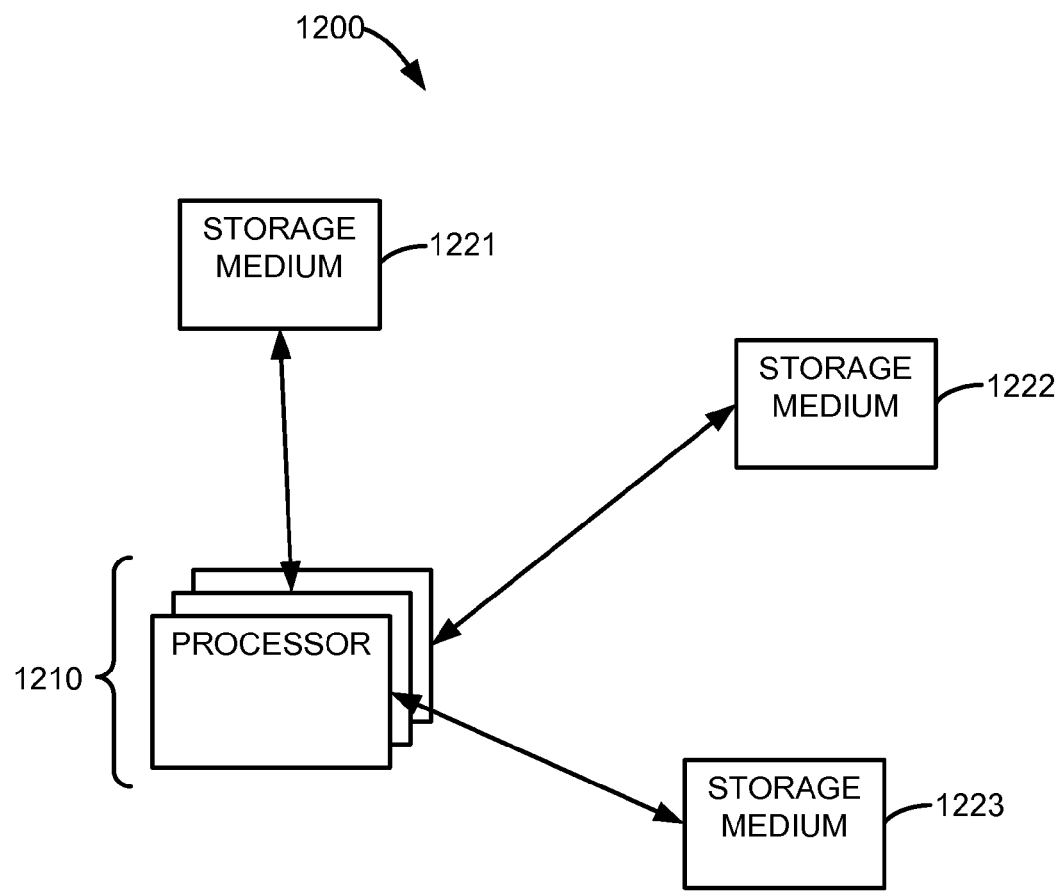
FIG. 12 is a schematic block diagram of a system including a processor and storage media, according to an embodiment.

As an example of a system including one or more processors and processor-readable storage media, FIG. 12 is a schematic block diagram of system 1200 including a processor and storage media, according to an embodiment. As illustrated in FIG. 12, system 1200 includes one or more processors 1210 operatively coupled to storage medium 1221, storage medium 1222, and storage medium 1223. One or more processors 1210 can access instructions or code at storage medium 1221, storage medium 1222, and storage medium 1223. Storage media 1221, 1222, and 1223 can be any processor-readable media and/or related devices to access processor-readable media. For example, storage medium 1221 can be a hard disk drive including a magnetic storage medium, storage medium 1222 can be an optical drive such as a DVD drive and can accept DVD storage media on which processor-readable instructions such as processor-readable instructions that implement a report generation tool can be stored, and storage medium 1223 can be a FLASH memory drive with a Universal Serial Bus ("USB") interface. In some embodiments, storage media 1221, 1222, and/or 1223 can be local to (e.g., coupled to a common computing device) one or more processors 1210. In some embodiments, storage media 1221, 1222, and/or 1223 can be remote from (e.g., coupled to a separate computing device) one or more processors 1210 and in communication with one or more processors 1210 via communications link. Furthermore, one or more of storage media 1221, 1222, and/or 1223 can be local to one or more processors 1210 and one or more of the remaining of storage media 1221, 1222, and/or 1223 can be remote from one or more processors 1210.

As a more specific example, one or more processors 1210 can be included within a computing device such as a communications device having an internal hard disk drive data store represented by storage medium 1221 and a removable solid-state data store such as a Secure Digital High-Capacity ("SDHC") memory card represented by storage medium 1222. The computing device can also include a USB host controller to communicate with a USB FLASH memory drive represented by storage medium 1223. One or more processors 1210 can access processor-readable instructions such as processor-readable instructions that implement an operating system, software application such as a report generation tool, and/or one or more processes at any of storage media 1221, 1222, and/or 1223. Said differently, one or more processors 1210 can interpret or execute instructions at processor-readable media via storage medium 1221, storage medium 1222, and/or storage medium 1223. For example, a computing device can execute a report generation tool application stored at a remote storage medium.

Alternatively, for example, storage media 1221 and 1222 can be remote from a computing device including one or more processors 1210 and storage medium 1223 can be local to that computing device. The computing device including one or more processors 1210 can download a report generation tool application from one or both of remote storage media 1221 or 1222 via communications link such as a communications network to local storage medium 1223 and execute the report generation tool application from local storage medium 1223.

In some embodiments, system 1200 can include one or more memories such as RAM that function as a cache between one or more of storage medium 1221, storage medium 1222, and/or storage medium 1223 and one or more processors 1210 for instructions or code stored (or accessible) at one or more of storage medium 1221, storage medium 1222, and/or storage medium 1223.

While certain embodiments have been shown and described above, various changes in form and details may be made. For example, some features that have been described in relation to one embodiment and/or process can be related to other embodiments. In other words, processes, features, components, and/or properties described in relation to one embodiment can be useful in other embodiments. Furthermore, it should be understood that the systems and methods described herein can include various combinations and/or sub-combinations of the components and/or features of the different embodiments described. As a specific example, embodiments discussed in relation to a communications network can be applicable to other information systems. Thus, features described with reference to one or more embodiments can be combined with other embodiments described herein.

What is claimed is:

1. A report generation method, comprising:

receiving, by a report generation tool of a communications network, a request for a first report associated with a first resource included in the communications network;

identifying, by the report generation tool, a second resource associated with the first resource and included in the communications network, in response to receiving the request for the first report associated with the first resource;

generating, by the report generation tool, a reference to a second report associated with the second resource;

embedding the reference to the second report at the first report; and providing, by the report generation tool, the first report for a user.

2. The method of claim 1, wherein the reference to the second report includes a context identifier associated with the first resource or a context identifier associated with the first report.

3. The method of claim 1, further comprising:
providing, at a first time, the second report for the user in response to selection of the reference to the second report at the first report, the second report including a reference to the first report; and
providing, at a second time after the first time, the first report for the user in response to selection of the reference to the first report at the second report.

4. The method of claim 1, further comprising:
storing the first report at a data store;
providing, at a first time, the second report for the user in response to selection of the reference to the second report at the first report, the second report including a reference to the first report; and
providing from the data store, at a second time after the first time, the first report for the user in response to selection of the reference to the first report at the second report.

5. The method of claim 1, further comprising:
generating the second report in response to selection of the reference to the second report at the first report, the second report including a reference to the first report.

6. The method of claim 1, wherein the first resource depends on the second resource.

7. The method of claim 1, wherein:
the first resource and the second resource are each associated with a respective group identifier, and
a report for a resource associated with a particular group identifier includes references to other reports for other resources associated with the particular group identifier.

8. The method of claim 1, further comprising:
identifying a third resource associated with the first resource; and
generating a reference to a third report associated with the third resource, the first report including the reference to the third report.

9. A non-transitory processor-readable medium storing instructions that, when executed by a processor, cause the processor to perform a process comprising:
receiving a request for a first report associated with a first resource of a communications network;
in response to receiving the request for the first report associated with the first resource, identifying a second resource associated with the first resource;
embedding a reference at the first report to a second report associated with the second resource;
providing the first report for a user;
storing the second report at a data store; and
while the first report is provided for the user, responding to selection of the reference to the second report embedded at the first report by providing the second report for the user from the data store.

10. The non-transitory processor-readable medium of claim 9, the process further comprising:
generating, before the embedding, the first report in response to the request.

11. The non-transitory processor-readable medium of claim 9, wherein
the identifying includes determining that a resource type of the first resource is associated with a resource type of the second resource.

12. The non-transitory processor-readable medium of claim 9, wherein
the first resource is hosted at the second resource or the first resource depends on the second resource.

13. The non-transitory processor-readable medium of claim 9, the process further comprising:
providing, at a first time, the second report for the user in response to selection of the reference to the second report at the first report, the second report including a reference to the first report.

14. The non-transitory processor-readable medium of claim 9, the process further comprising:
identifying a third resource associated with the first resource; and
embedding a reference to a third report in the first report, the third report associated with the third resource.

15. A report generation system in a communications network, comprising:
a user interface module to receive report requests from a user and to provide reports for a user;
a reference generation module to:
in response to a report request including a context identifier associated with a first resource in the communications network, identify from a data store a second resource based on the context identifier,
generate a reference to a second report associated with the identified second resource, and
embed the reference to the second report at the first report; and
a report generation module to:
generate the first report in response to the report request,
generate the second report,
store the second report at the data store, and
access the second report at the data store for provision by the user interface module, in response to selection of the reference to the second report embedded at the first report.

16. The system of claim 15, wherein:
the report generation module is to generate the second report in response to selection of the reference to the second report at the first report; and
the reference generation module is to embed a reference to the first report at the second report.

17. The system of claim 15, wherein the reference to the second report includes a context identifier associated with the first report.

18. The system of claim 15, wherein the reference generation module is to identify at the data store a plurality of resources based on the context identifier associated with the first resource and generate a plurality of references in response to the report request,
each reference from the plurality of references uniquely associated with a report from a plurality of reports,
each report from the plurality of reports associated with a resource from the plurality of resources, the second resource included within the plurality of resources, and
the reference generation module to embed each reference from the plurality of references at the first report.

19. The method of claim 1, wherein the first resource and the second resource are included in the communications network, and
the second resource is identified by the identifying as being associated with the first resource from a database that includes information about relationships between logical resources and physical resources of the communications network.

20. The method of claim 1, wherein the second resource is identified by the identifying based on network mapping of the communications network.

\* \* \* \* \*